(12) United States Patent  
Kato

(10) Patent No.: US 7,747,411 B2  
(45) Date of Patent: Jun. 29, 2010

(54) PEDOMETER

(75) Inventor: Kazuo Kato, Chiba (JP)

(73) Assignee: Seiko Instruments Inc. (JP)

( * ) Notice: Subject to any disclaimer, the term of this patent is extended or adjusted under 35 U.S.C. 154(b) by 208 days.

(21) Appl. No.: 11/903,139

(22) Filed: Sep. 20, 2007

(65) Prior Publication Data

US 2008/0114565 A1    May 15, 2008

(30) Foreign Application Priority Data

Sep. 29, 2006   (JP) .............................. 2006-266627

(51) Int. Cl.  
*G01C 22/00* (2006.01)
(52) U.S. Cl. ...................................... 702/160
(58) Field of Classification Search ................ 702/141, 702/150, 160; 73/865.4; 377/24, 24.2  
See application file for complete search history.

(56) References Cited

U.S. PATENT DOCUMENTS

| | | | | |
|---|---|---|---|---|
| 4,962,469 A | * | 10/1990 | Ono et al. | .................... 702/160 |
| 2004/0186695 A1 | | 9/2004 | Aoshima et al. | |
| 2006/0288781 A1 | * | 12/2006 | Daumer et al. | ................ 73/510 |

FOREIGN PATENT DOCUMENTS

| | | |
|---|---|---|
| EP | 1 612 518 | 1/2006 |
| EP | 1 821 071 A1 | 8/2007 |
| JP | 0002612 | 1/1990 |
| JP | 05142363 | 6/1993 |
| JP | 07144039 | 6/1995 |
| JP | 08077322 | 3/1996 |
| JP | 01265166 | 10/1999 |
| JP | 2004101346 | 4/2004 |
| JP | 2005283340 | 10/2005 |

* cited by examiner

*Primary Examiner*—Drew A Dunn  
*Assistant Examiner*—Stephen J Cherry  
(74) *Attorney, Agent, or Firm*—Adams & Wilks

(57) ABSTRACT

A pedometer sensor outputs a detecting signal in correspondence with the moving motion of a person to a CPU via a variable filter circuit that has a variable passing frequency band. In a walking state, when a voltage comparing circuit determines that the signal level of the detecting signal is equal to or higher than a predetermined level and a period of the detecting signal from the filter circuit set to a band for running is at a period within a predetermined range, the CPU determines that the moving motion is changed from walking to running, maintains a state in which a frequency switching circuit sets a passing frequency band of the filter circuit to a band for running, and calculates a number of steps based on the detecting signal passing the filter circuit.

18 Claims, 4 Drawing Sheets

PEDOMETER

BACKGROUND OF THE INVENTION

1. Field of the Invention

The present invention relates to a pedometer for measuring a number of steps by detecting walking or running of the human body, particularly relates to a pedometer having a step number measuring function in walking and in running.

2. Description of the Related Art

In a background art, a pedometer capable of measuring the number of steps in walking and in running has been developed.

For example, according to JP-A-2004-101346 (paragraphs through [0032], FIG. 4 through FIG. 6) and JP-A-2005-283340 (paragraphs [0023] through [0040], FIG. 1 through FIG. 4), a walking vibration is detected by a piezoelectric element included in a main body of a wristwatch and a number of steps is counted by amplifying a signal necessary for detecting walking by an amplifying circuit and a filter circuit. However, a characteristic of the filter circuit is optimized for measuring the number of steps in walking, and therefore, in running, not a signal by a landing impact but only a signal of arm swinging can be detected to pose a problem that a number of steps in running cannot be measured accurately.

JP-A-5-142363 (paragraphs [0008] through [0016], FIG. 1, FIG. 2) discloses an invention disclosing a radio wave correcting timepiece for detecting a radio wave having a previously set frequency and the strongest electric field by switching a tuning circuit and a selecting circuit for correcting time based on time information included in the detected radio wave, and a filter circuit is switched in accordance with the received radio wave. However, Patent Reference 3 does not describe a correlation in the pedometer for measuring walking or measuring running, and therefore, Patent Reference 3 cannot simply be applied to a pedometer.

On the other hand, Japanese Patent Publication No. 2712269 (page 3 through page 4, FIG. 4 through FIG. 6), JP-A-8-77322 (paragraphs [0011] through [0023], FIG. 9, FIG. 13) and JP-A-7-144039 (paragraphs [0013] through [0016], FIG. 1, FIG. 3) disclose an invention for measuring the step of numbers by detecting a plurality of moving motions of walking, running and the like. However, the invention described in Japanese Patent Publication No. 2712269, JP-A-8-77322 and JP-A-7-144039 is provided with only a function of simply controlling a gain of an amplifying circuit in accordance with a moving motion, and therefore, the problem is posed in an measurement accuracy.

Further, although JP-UM-A-2-612 (page 1, FIG. 4, FIG. 5) is constituted to change a processing of calculating the step of numbers in accordance with a kind of a moving motion, the kind of the moving motion is set by an external operation, and therefore, a problem that the operation becomes complicated is posed.

It is a problem of the invention to dispense with an operation of selecting a measuring mode and enabling to measure the number of steps highly accurately when the number of steps is measured in walking and in running.

SUMMARY OF THE INVENTION

According to the invention, there is provided a pedometer characterized in including a sensor for detecting a moving motion of a measured person and outputting a detecting signal in correspondence therewith, filter means inputted with the detecting signal from the sensor and having a variable passing frequency band, filter controlling means for switching the passing frequency band of the filter means to either of a band for walking and a band for running, a step number calculating means for calculating a number of steps based on the detecting signal passing through the filter means, a signal level determining means for determining a level of the detecting signal passing the filter means, and moving motion determining means for determining that the moving motion is changed from walking to running when the signal level determining means determines that a signal level of the detecting signal is at a predetermined level or higher and the detecting signal from the filter means set to the band for running is at a period within a predetermined range, wherein when the moving motion determining means determines running, the filter controlling means maintains the passing frequency band of the filter means to a state of setting the band for running, and the step number calculating means calculates the number of steps based on the detecting signal passing the filter means.

When the moving motion determining means determines running, the filter controlling means maintains the passing frequency band of the filter means to a state of being set to the band for running, the step number calculating means calculates the number of steps based on the detecting signal passing the filter means.

Here, there may be constructed a constitution in which the moving motion determining means determines that the moving motion is changed from walking to running in a case in which when the passing frequency band is the band for running, the period of the detecting signal outputted from the filter means becomes a half of the period of the detecting signal outputted from the filter means when the band is the band for walking.

Further, there may be constructed a constitution in which the moving motion determining means determines that the moving motion is changed from walking to running when the detecting signal of the half period is provided continuously for a first predetermined time period.

Further, there may be constructed a constitution in which the step number calculating means carries out a preliminary step number measurement for a second predetermined time period based on the detecting signal when the signal level determining means determines that the signal level of the detecting signal is at the predetermined level or higher and the detecting signal from the filter means is at the period within the predetermined range, wherein the filter controlling means sets the passing frequency band of the filter means from the band for walking to the band for running when the detecting signal of the period within the predetermined range is continuously provided for the second predetermined time period.

Further, there may be constructed a constitution in which the step number calculating means counts each of the detecting signal detected in the preliminary step number measurement for the second predetermined time period as two steps and counts each of the detecting signal detected at outside of the second predetermined time period as one step.

Further, there may be constructed a constitution in which the moving motion determining means determines that the moving motion is changed from running to walking when the detecting signal from the filter means is not detected continuously for a third predetermined time period, wherein the filter controlling means changes the passing frequency band of the filter means from the band for running to the band for walking when the moving motion determining means determines that running is changed to walking.

According to the invention, when the number of steps is measured in walking and in running, an operation of selecting the measuring mode is dispensed with, and the number of steps can be measured highly accurately.

Further, even when the moving motion is changed, it is not necessary to manually carry out an operation of switching to detect walking or detect running to achieve an effect of promoting operability.

DESCRIPTION OF THE PREFERRED EMBODIMENTS

Figure 1:
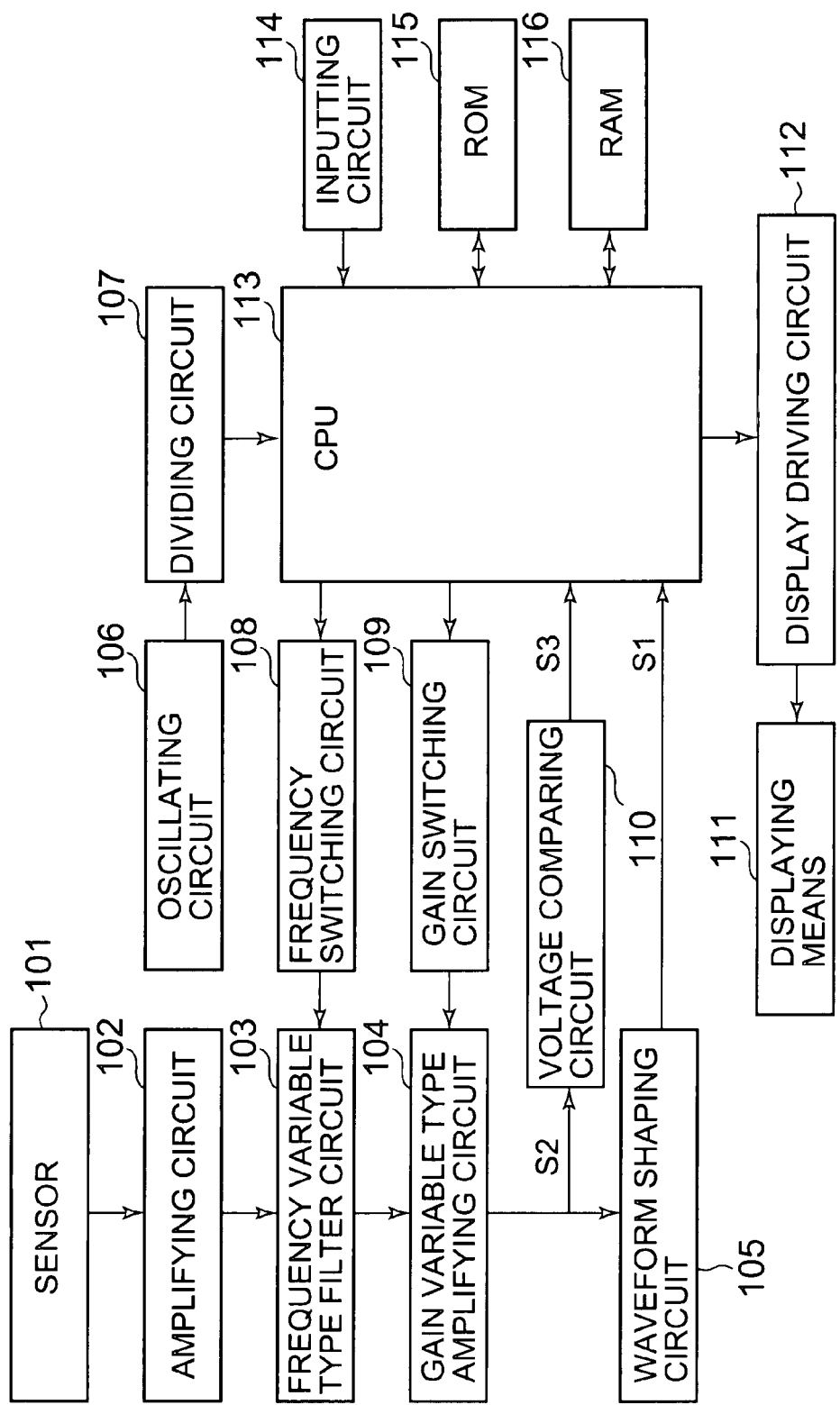
FIG. 1 is a block diagram of a pedometer according to an embodiment of the invention.

FIG. 1 is a block diagram of a pedometer according to an embodiment of the invention.

In FIG. 1, a pedometer includes a sensor (acceleration sensor in the embodiment) 101 for detecting a corresponding detecting signal at each time of detecting a moving motion of a measured person, an amplifying circuit 102 for amplifying to output a detecting signal from the sensor 101, a filter circuit 103 for passing a signal of a predetermined passing frequency band in the signal from the amplifying circuit 102 and making the passing frequency band variable, an amplifying circuit 104 for amplifying to output a detecting signal from the filter circuit 103 and making a gain thereof variable, a waveform shaping circuit 105 for shaping a waveform of a detecting signal in an analog signal style from the amplifying circuit 104 to convert into a detecting signal in a digital signal style to be outputted.

Further, the pedometer includes an oscillating circuit 106 for generating a signal of a predetermined frequency, a dividing circuit 107 for outputting a timepiece signal constituting a reference of a time counting operation and a clock signal of a central processing unit (CPU) 113, a frequency switching circuit 108 for switching to set a passing frequency band of the filter circuit 103 based on an instruction from CPU 113, a gain switching circuit 109 for switching to set a gain of the amplifying circuit 104 based on an instruction from CPU 113, a voltage comparing circuit 110 for detecting a signal level of the detecting signal in the analog signal style from the amplifying circuit 104, displaying means 111 for displaying the measured number of steps, current time and the like, a display driving circuit 112 for driving the displaying means 111 in response to a control of CPU 113, CPU 113 for executing a processing mentioned later by executing a program stored to a read only memory (ROM) 115, an inputting circuit 114 for executing an external operation of starting/finishing to measure the number of steps, switching a display content and the like, ROM 115 stored with a program or the like of CPU 113, and a random access memory (RAM) 116 for storing measured number of steps data and the like.

Here, the filter circuit 103 constitutes filter means, CPU 113 constitutes step number calculating means and moving motion determining means, the voltage comparing circuit 110 constitutes signal level determining means, and the inputting circuit 114 constitutes operating means. The frequency switching circuit 108 and CPU 113 constitute filter controlling means. The gain switching circuit 109 and CPU 113 constitute gain switching means. Further, ROM 115 and RAM 116 constitute storing means.

Figure 2:
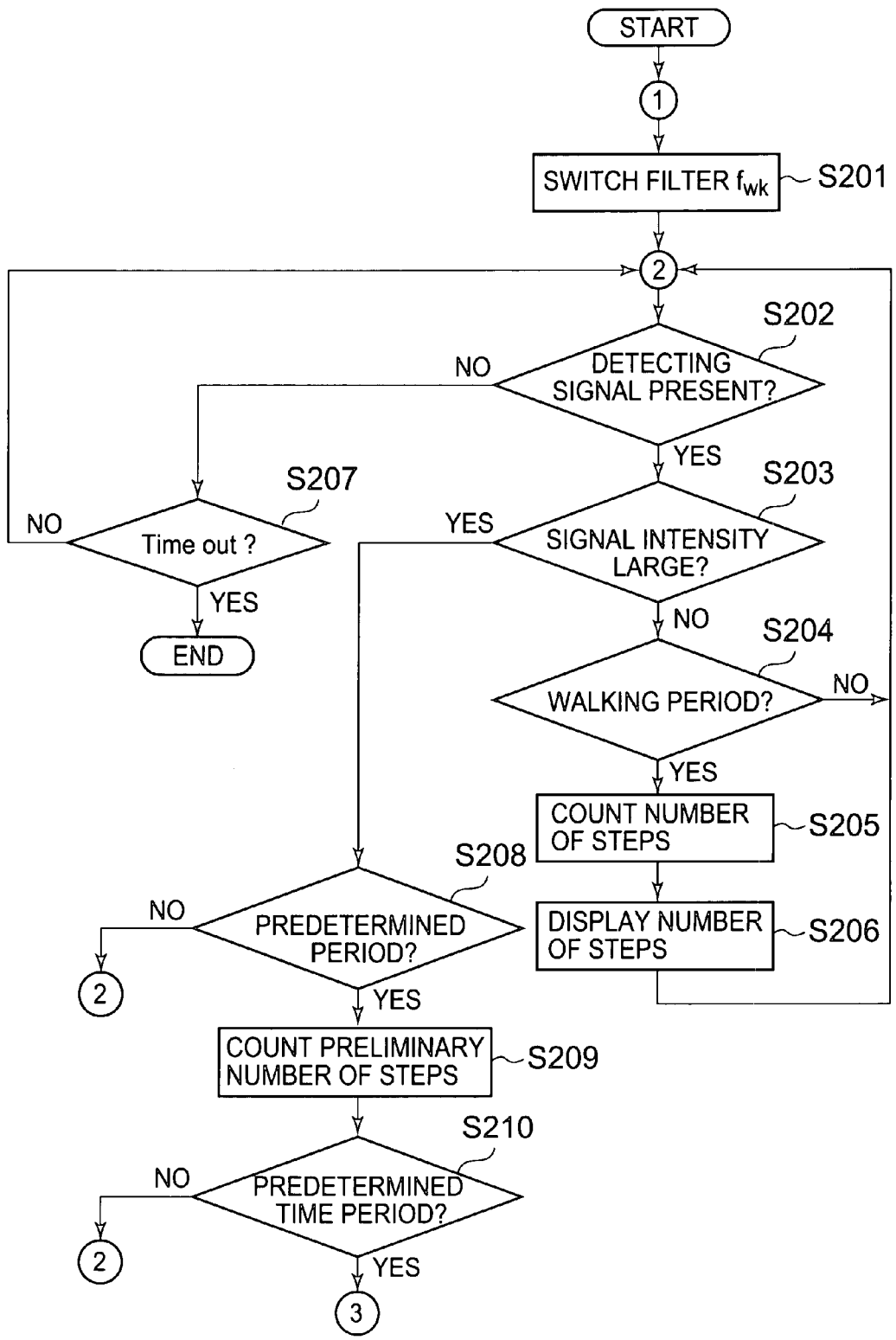
FIG. 2 is a flowchart showing a processing of the pedometer according to the embodiment of the invention.
Figure 3:
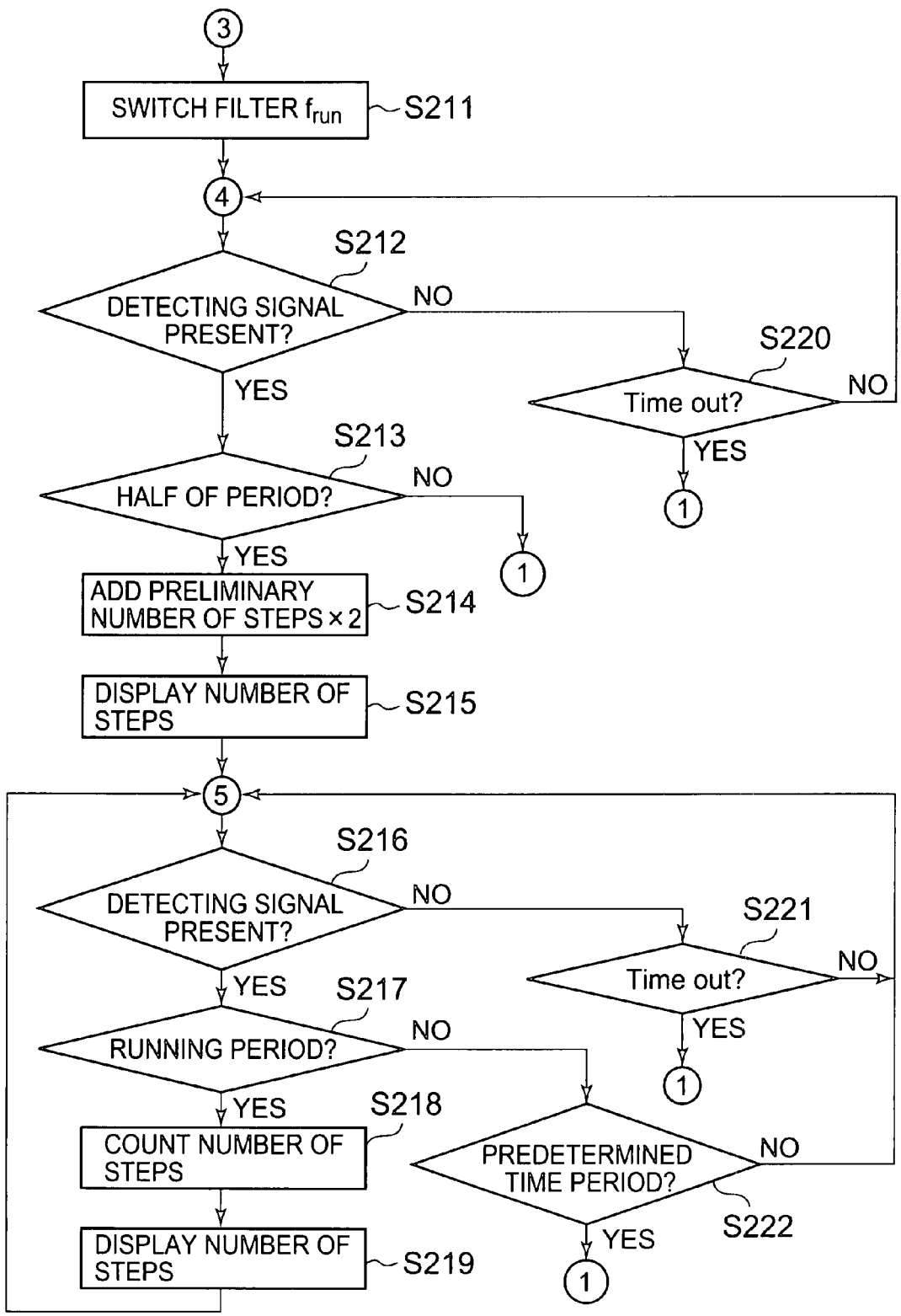
FIG. 3 is a flowchart showing the processing of the pedometer according to the embodiment of the invention.

FIG. 2 and FIG. 3 are flowcharts showing a processing of the pedometer according to the embodiment, mainly showing a processing executed by executing the programs stored to ROM 115 by CPU 113.

Figure 4:
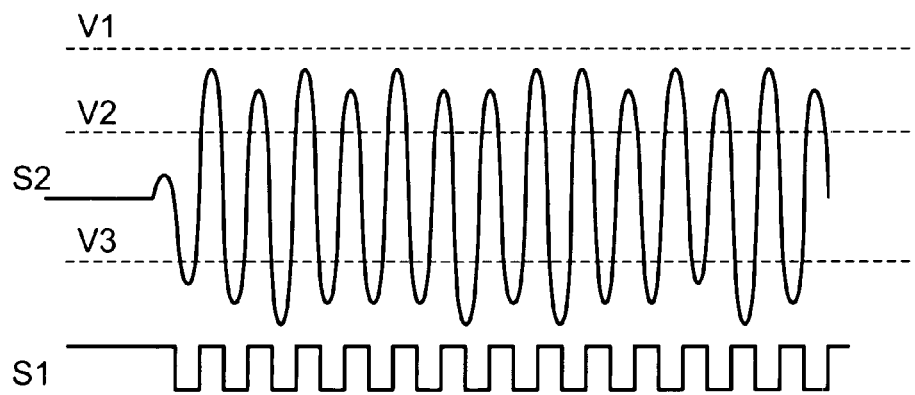
FIG. 4 is a signal waveform diagram of the pedometer according to the embodiment of the invention.
Figure 5:
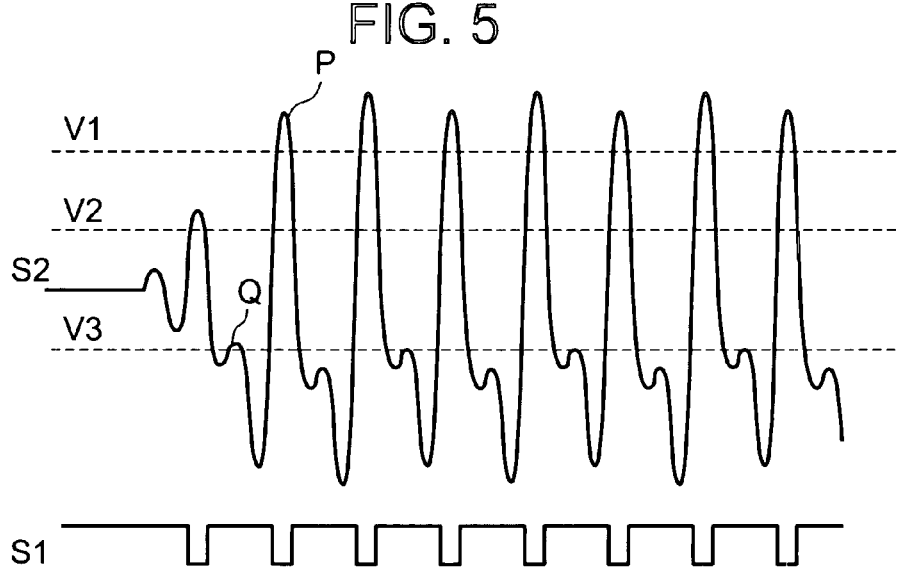
FIG. 5 is a signal waveform diagram of the pedometer according to the embodiment of the invention.
Figure 6:
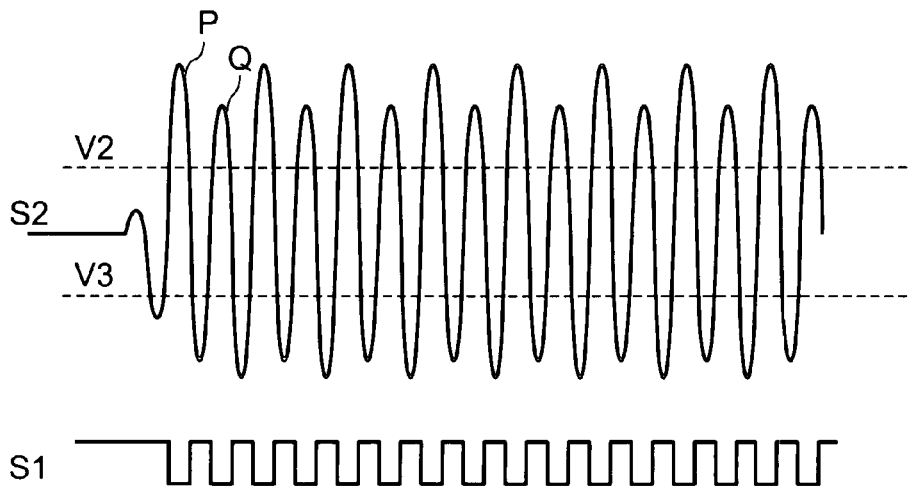
FIG. 6 is a signal waveform diagram of the pedometer according to the embodiment of the invention.

FIG. 4 through FIG. 6 are signal waveform diagrams of the pedometer according to the embodiment, FIG. 4 is a signal waveform diagram in walking, FIG. 5 and FIG. 6 are signal waveform diagrams in running.

Operation of the pedometer according to the embodiment will be explained in reference to FIG. 1 through FIG. 6 as follows.

When the number of steps is measured, a measured person mounts the pedometer on the arm, and instructs to start measuring a number of steps from the inputting circuit 114, thereby, CPU 113 starts a step number measuring operation.

CPU 113 sets a passing frequency band of the filter circuit 103 to a band for walking (for example, a predetermined band width having a center frequency of 1 through 2 Hz) by controlling the frequency switching circuit 108, and sets the gain of the amplifying circuit 104 to a gain for walking by controlling the gain switching circuit 109 (processing step S201 of FIG. 2) to be brought into a walking measuring mode for measuring the number of steps in a walking state.

Under the state, the sensor 101 outputs a detecting signal in accordance with walking. The detecting signal is amplified by the amplifying circuit 102, passes through the filter circuit 103, thereafter, amplified by the amplifying circuit 104 and is outputted to the waveform shaping circuit 105 and the voltage comparing circuit 110 as a detecting signal S2 of an analog signal style.

The waveform shaping circuit 105 converts the detecting signal S2 in the analog signal style into a detecting signal S1 of a digital signal style to output to CPU 113. At this occasion, as shown by FIG. 4, a threshold of the waveform shaping circuit 105 is set to provide a hysteresis characteristic, a waveform of the detecting signal S2 changed in an increasing direction is shaped by a threshold V2 at a high level, and a waveform of the detecting signal S2 changed in a reducing direction is shaped by a threshold V3 at a low level. The detecting signal S1 is a signal in synchronism with a landing motion in walking, and a rise portion thereof indicates one step.

CPU 113 determines whether the detecting signal S1 is received from the waveform shaping circuit 105 (step S202) and finishes the processing when the detecting signal S1 is not received for a predetermined time period (step S207).

As shown by FIG. 3, a threshold V1 of the voltage comparing circuit 110 is set to a value equal to or higher than a signal level of the detecting signal S2 detected in walking, the voltage comparing circuit 110 outputs a comparison result signal S3 showing that the detecting signal S2 is the signal in walking to CPU 113 so far as the detecting signal S2 does not exceed the threshold V1. On the other hand, when the detecting signal S2 exceeds the threshold V1, the voltage comparing circuit 110 outputs the comparison result signal S3 indicating that the detecting signal S2 is a signal in running to CPU 113.

At processing step S202, when CPU 113 determines that the detecting signal S1 is received, CPU 113 determines whether a signal intensity of the detecting signal S2 is equal to or higher than the predetermined level based on the comparison result signal S3 from the voltage comparing circuit 110 (step S203), when the signal level of the detecting signal S2 is equal to or lower than the threshold V1, CPU 113 determines whether the detecting signal S1 is a signal having a predetermined walking period (step S204).

In the case of the walking period, CPU 113 calculates the number of steps based on the detecting signal S1 from the waveform shaping circuit 105 (step S205), successively stores the calculated number of steps to RAM 116 and displays an accumulated step number or the like by the displaying means 111 (step S206), returns to processing step S202 to repeat the processing. When the period is not walking period, CPU 113 returns to processing step S202.

Next, an explanation will be given of an operation of switching the measuring mode of the pedometer from the walking measuring mode to a running measuring mode of measuring a number of steps in running when the moving motion is shifted from the walking state to a running state.

When the moving motion is switched from walking to running, as shown by FIG. 5, the signal level of the detecting signal S2 exceeds the threshold V1 of the voltage comparing circuit 110 by arm swinging motion (P). The voltage comparing circuit 110 outputs the comparison result signal S3 indicating that the detecting signal S2 is the signal in running to CPU 113 since the detecting signal S2 exceeds the threshold V1. Further, a signal (Q) by landing is at a low level, and therefore, as a result, the detecting signal S1 becomes a signal having a period the same as that of arm swinging, and each detecting signal S1 becomes a signal in correspondence with two steps.

At processing step S203, CPU 113 determines that the detecting signal S2 is a large signal a signal level of which exceeds the threshold V1 based on the comparison result signal S3 from the voltage comparing circuit 110, thereafter, determines whether the detecting signal S1 is a signal having a period within a predetermined range (for example, a period twice as much as a signal period provided in running) (step S208).

When CPU 113 determines the period within the predetermined range, CPU 113 caries out a preliminary step number counting operation for a predetermined time period (step S209), thereafter, determines whether a second predetermined time period has elapsed (step S210), CPU 113 returns to the processing step S202 when the second predetermined time period has not elapsed and when the second predetermined time period has elapsed, CPU 113 switches to set a passing frequency band of the first circuit 103 to a band for running (a predetermined band width having a center frequency of 2 through 4 Hz) by controlling the frequency switching circuit 108 (step S211).

In the case of running, by switching the passing frequency band of the filter circuit 103 to the band for running, as shown by FIG. 6, according to the detecting signal S2, the signal produced in landing (Q) is detected by a large signal level, and therefore, the period of the detecting signal S1 becomes a period of a half of the detecting signal S1 when the preliminary pedometer counting operation is carried out. That is, by switching the characteristic of the filter circuit 103, according to the detecting signal S2, the signal by arm swinging is more or less restrained and the signal in landing impact appears to be large. Thereby, CPU 113 is inputted with the detecting signal S1 in synchronism with landing and arm swinging motions in running, and the period of the detecting signal S1 becomes a half before switching the filter circuit 103.

Next, CPU 113 determines presence or absence of the detecting signal S1 (step S212), when the detecting signal S1 has not been detected for a predetermined time period, CPU 113 returns to processing step S201 (step S220), when the detecting signal S1 has been detected, CPU 113 determines whether the period is the half of the predetermined period (the period determined at processing step S208) (step S213). CPU 113 returns to processing step S201 when the period of the detecting signal S1 is not the half of the predetermined period.

CPU 113 determines running when CPU 113 determines that the detecting signal S1 is received at processing step S212 and the processing of determining that the detecting signal is the half of the predetermined period at processing step S213 is repeated continuously for a first predetermined time period.

When CPU 113 determines running as described above, CPU calculates a regular number of steps by doubling the number of steps counted by the preliminary step number counting operation of the second predetermined time period (preliminary number of steps), calculates an accumulated number of steps by adding the regular number of steps to data of the number of steps stored to RAN 116 and displays the accumulated number of steps or the like on the displaying means 111 (step S215). Further, although the number of steps is calculated by constituting each of the detecting signals detected in measuring the preliminary number of steps for the second predetermined time period as two steps, the number of steps is calculated by constituting the detecting signal detected for a time period other than the second predetermined time period as one step.

In this way, a transient step number measuring operation (that is, the preliminary step number counting operation) in shifting from the walking measuring mode to the running measuring mode can accurately be carried out.

Next, CPU 113 determines presence or absence of the detecting signal S1 (step S216), when the detecting signal S1 cannot be received for a predetermined time period, CPU 113 returns to processing step S201 (step S221), when the detecting signal S1 is received, CPU 113 determines whether the period of the detecting signal S1 is a predetermined period in correspondence with running (running period) (step S217). CPU 113 returns to processing step S201 when a state in which the period is not the running period continues for a predetermined time period (step S222).

CPU 113 counts the number of steps based on the detecting signal S1 when the detecting signal S1 is in the running period, calculates the accumulated number of steps by adding the number of steps to the data of the number of steps stored to RAM 116 (step S218), successively stores the calculated number of steps to RAM 116 and displays the number of steps or the like on the displaying means 111 (step S219), returns to processing step S216 to repeat the processing. Thereby, the accurate number of steps in running is measured.

In this way, in the running state, when the voltage comparing circuit 110 determines that the signal level of the detecting signal S2 is at the predetermined level or higher and the detecting signal S2 from the filter circuit 103 set to a band for running is at the period within the predetermined range, CPU 113 determines that the moving motion is changed from walking to running, maintains the passing frequency band of the filter circuit 103 to the state of being set to the band for running, sets the amplifying circuit 104 to maintain at the gain for running and calculates the number of steps based on the detecting signal S1 passing the filter circuit 103.

That is, the walking state, the running state are determined based on the detecting signal S2, the characteristic of the filter circuit 103 is switched to a pertinent setting, and therefore, the number of steps can accurately be measured even when the moving motion is changed from walking to running.

On the other hand, when the measured person stops running and starts walking, the detecting signal S2 becomes lower than the threshold V1 of the waveform shaping circuit 105, the detecting signal S1 inputted to CPU 113 is not present, and the detecting signal S1 is not received at processing step S216. Or the period of the detecting signal S1 becomes longer than the predetermined period.

When the no signal state continues for the predetermined time period (steps S221 S222), CPU 113 sets the passing frequency band of the filter circuit 103 to the band for walking (for example, predetermined band width having a center frequency of 1 through 2 Hz) by controlling the frequency switching circuit 108, and sets the gain of the amplifying circuit 104 to the gain for walking by controlling the gain switching circuit 109 (processing step S201 of FIG. 2).

By switching the filter characteristic of the filter circuit 103 for walking, the detecting signal S1 in synchronism with landing in walking is inputted to CPU 113.

At processing step S202, when CPU 113 determines that the detecting signal S1 is received, CPU 113 determines whether the signal intensity of the detecting signal S2 is at the predetermined level or higher based on the comparison result signal S3 from the voltage comparing circuit 110 (step S203), when the signal level of the detecting signal S2 is equal to or lower than the threshold V1, CPU 113 determines whether the detecting signal S1 is a signal of the predetermined walking period (step S204).

CPU 113 determines walking when it is determined that the detecting signal S1 is received at processing step S202 and the detecting signal is at the predetermined level (that is, level equal to or lower than threshold V1) at processing step S203 and the state in which the period of the detecting signal S1 is the walking period is repeated continuously for a third predetermined time period.

When CPU 113 determines walking as described above, CPU 113 calculates the accumulated number of steps by adding the number of steps calculated based on the detecting signal S1 to the data of the number of steps stored to RAM 116 (step S205), thereafter, successively stores the calculated number of steps to the RAM 116 and displays the accumulated number of steps or the like on the displaying means 111 (step S206), returns to processing step S202 to measure the number of steps in the walking measuring mode.

In this way, the characteristic of the filter circuit 103 is switched to the pertinent setting by determining the walking state, the running state based on the detecting signal S2, and therefore, even when the moving motion is changed from running to waking, the number of steps can accurately be measured.

As described above, according to the pedometer according to the embodiment, the number of steps can accurately be measured even when the moving motion is either of walking and running.

Further, the measured person needs not to change the measuring mode by manually operating the pedometer even when the moving motion is changed, and therefore, an effect of promoting operability is achieved.

Further, although according to the embodiment, an explanation has been given by taking an example of the pedometer of the wristwatch type used by mounting the pedometer on the arm of the measured person, the embodiment is applicable to various pedometers of a pedometer of a style of being used by being mounted to the waist, a pedometer of a style of being used in a state of being held by being contained in a bag or the like, a pedometer including a timepiece function and the like.

The invention is applicable to various pedometers of a pedometer of a style of being used by being mounted on the arm, a pedometer of a style of being used by being mounted to the waist, a pedometer of a style of being used in a state of being held by being contained in a bag or the like, a pedometer including a timepiece function and the like.

What is claimed is:

1. A pedometer comprising:
a sensor that detects a moving motion of a person and that outputs a detecting signal in correspondence therewith;
a filter to which is inputted the detecting signal from the sensor and which has a variable passing frequency band;
filter controlling means for switching the passing frequency band of the filter to either of a band for walking and a band for running;
step number calculating means for calculating a number of steps based on the detecting signal passing through the filter;
signal level determining means for determining a level of the detecting signal passing through the filter; and
moving motion determining means for determining that the moving motion is changed from walking to running when the signal level determining means determines that a signal level of the detecting signal is at a predetermined level or higher and a period of the detecting signal from the filter set to the band for running is at a period within a predetermined range;
wherein when the moving motion determining means determines running, the filter controlling means maintains the passing frequency band of the filter to a state of setting the band for running, and the step number calculating means calculates the number of steps based on the detecting signal passing the filter.

2. A pedometer according to claim 1; wherein the moving motion determining means determines that the moving motion is changed from walking to running in a case in which when the passing frequency band is the band for running, the period of the detecting signal outputted from the filter becomes a half of the period of the detecting signal outputted from the filter when the band is the band for walking.

3. A pedometer according to claim 2; wherein the moving motion determining means determines that the moving motion is changed from walking to running when the detecting signal of the half period is provided continuously for a first predetermined time period.

4. A pedometer according to claim 1; wherein the step number calculating means carries out a preliminary step number measurement for a second predetermined time period based on the detecting signal when the signal level determining means determines that the signal level of the detecting signal is at the predetermined level or higher and the detecting signal from the filter is at the period within the predetermined range; and
wherein the filter controlling means sets the passing frequency band of the filter from the band for walking to the band for running when the detecting signal of the period within the predetermined range is continuously provided for the second predetermined time period.

5. A pedometer according to claim 2; wherein the step number calculating means carries out a preliminary step number measurement for a second predetermined time period based on the detecting signal when the signal level determining means determines that the signal level of the detecting signal is at the predetermined level or higher and the detecting signal from the filter is at the period within the predetermined range; and
wherein the filter controlling means sets the passing frequency band of the filter from the band for walking to the band for running when the detecting signal of the period within the predetermined range is continuously provided for the second predetermined time period.

6. A pedometer according to claim 3; wherein the step number calculating means carries out a preliminary step number measurement for a second predetermined time period based on the detecting signal when the signal level determining means determines that the signal level of the detecting signal is at the predetermined level or higher and the detecting signal from the filter is at the period within the predetermined range; and wherein the filter controlling means sets the passing frequency band of the filter from the band for walking to the band for running when the detecting signal of the period within the predetermined range is continuously provided for the second predetermined time period.

7. A pedometer according to claim 4; wherein the step number calculating means counts each detecting signal detected in the preliminary step number measurement for the second predetermined time period as two steps and counts each of the detecting signal detected outside of the second predetermined time period as one step.

8. A pedometer according to claim 5; wherein the step number calculating means counts each detecting signal detected in the preliminary step number measurement for the second predetermined time period as two steps and counts each of the detecting signal detected outside of the second predetermined time period as one step.

9. A pedometer according to claim 6; wherein the step number calculating means counts each detecting signal detected in the preliminary step number measurement for the second predetermined time period as two steps and counts each of the detecting signal detected outside of the second predetermined time period as one step.

10. A pedometer according to claim 1; wherein the moving motion determining means determines that the moving motion is changed from running to walking when the detecting signal from the filter is not detected continuously for a third predetermined time period; and wherein the filter controlling means changes the passing frequency band of the filter from the band for running to the band for walking when the moving motion determining means determines that running is changed to walking.

11. A pedometer according to claim 2; wherein the moving motion determining means determines that the moving motion is changed from running to walking when the detecting signal from the filter is not detected continuously for a third predetermined time period; and wherein the filter controlling means changes the passing frequency band of the filter from the band for running to the band for walking when the moving motion determining means determines that running is changed to walking.

12. A pedometer according to claim 3; wherein the moving motion determining means determines that the moving motion is changed from running to walking when the detecting signal from the filter is not detected continuously for a third predetermined time period; and wherein the filter controlling means changes the passing frequency band of the filter from the band for running to the band for walking when the moving motion determining means determines that running is changed to walking.

13. A pedometer according to claim 4; wherein the moving motion determining means determines that the moving motion is changed from running to walking when the detecting signal from the filter is not detected continuously for a third predetermined time period; and wherein the filter controlling means changes the passing frequency band of the filter means from the band for running to the band for walking when the moving motion determining means determines that running is changed to walking.

14. A pedometer according to claim 5; wherein the moving motion determining means determines that the moving motion is changed from running to walking when the detecting signal from the filter is not detected continuously for a third predetermined time period; and wherein the filter controlling means changes the passing frequency band of the filter from the band for running to the band for walking when the moving motion determining means determines that running is changed to walking.

15. A pedometer according to claim 6; wherein the moving motion determining means determines that the moving motion is changed from running to walking when the detecting signal from the filter is not detected continuously for a third predetermined time period; and wherein the filter controlling means changes the passing frequency band of the filter from the band for running to the band for walking when the moving motion determining means determines that running is changed to walking.

16. A pedometer according to claim 7; wherein the moving motion determining means determines that the moving motion is changed from running to walking when the detecting signal from the filter is not detected continuously for a third predetermined time period; and wherein the filter controlling means changes the passing frequency band of the filter from the band for running to the band for walking when the moving motion determining means determines that running is changed to walking.

17. A pedometer according to claim 8; wherein the moving motion determining means determines that the moving motion is changed from running to walking when the detecting signal from the filter is not detected continuously for a third predetermined time period; and wherein the filter controlling means changes the passing frequency band of the filter from the band for running to the band for walking when the moving motion determining means determines that running is changed to walking.

18. A pedometer according to claim 9; wherein the moving motion determining means determines that the moving motion is changed from running to walking when the detecting signal from the filter is not detected continuously for a third predetermined time period; and wherein the filter controlling means changes the passing frequency band of the filter from the band for running to the band for walking when the moving motion determining means determines that running is changed to walking.

* * * * *